Figure 1:
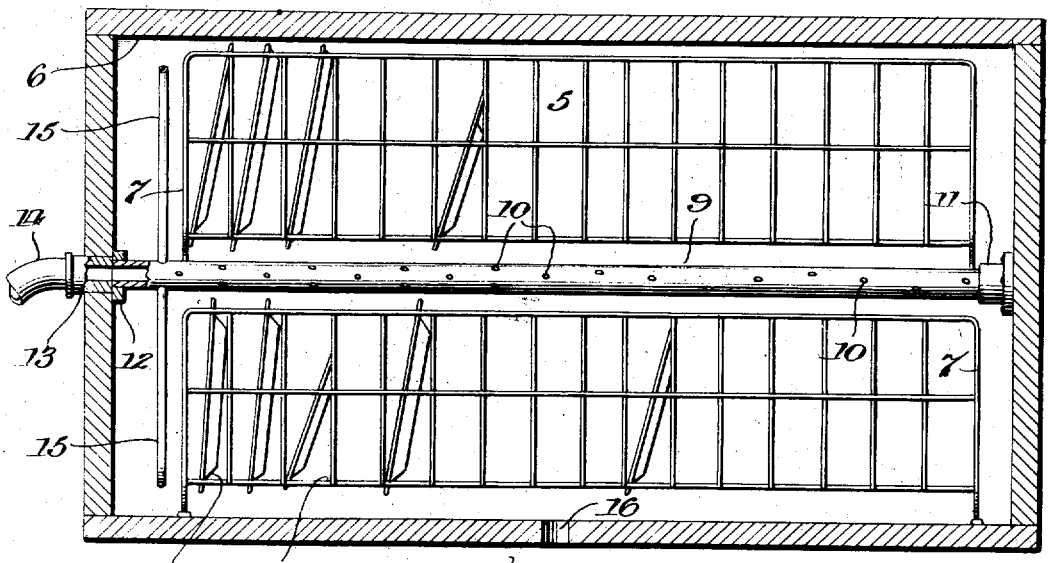

Aug. 7, 1923. Re. 15,670

H. ROSENBAUM

DISHWASHING APPARATUS

Original Filed Oct. 23, 1920

Harry Rosenbaum Inventor

Howard T. Cooke Key

By

Attorney

Reissued Aug. 7, 1923. Re. 15,670

UNITED STATES PATENT OFFICE.

HARRY ROSENBAUM, OF NEW YORK, N. Y.

DISHWASHING APPARATUS.

Original No. 1,386,734, dated August 9, 1921, Serial No. 418,887, filed October 23, 1920. Application for reissue filed January 28, 1922. Serial No. 532,510.

*To all whom it may concern:*

Be it known that I, HARRY ROSENBAUM, citizen of the United States, residing at New York, in the county of New York and State of New York, have invented new and useful Improvements in Dishwashing Apparatus, of which the following is a specification.

This invention relates to apparatus for washing dishes, and more particularly one in which the dishes are placed in a closed stationary receptacle and subjected to the cleansing action of a plurality of streams of water sprayed over the same.

The invention has for its object to provide a very simple and efficient apparatus of the kind stated, and one in which the spraying action is obtained by a very simple expedient.

With the object stated in view, the invention consists in a novel combination and arrangement of parts to be hereinafter described and claimed, and in order that the same may be better understood, reference is had to the accompanying drawing forming a part of the specification.

Figure 2:
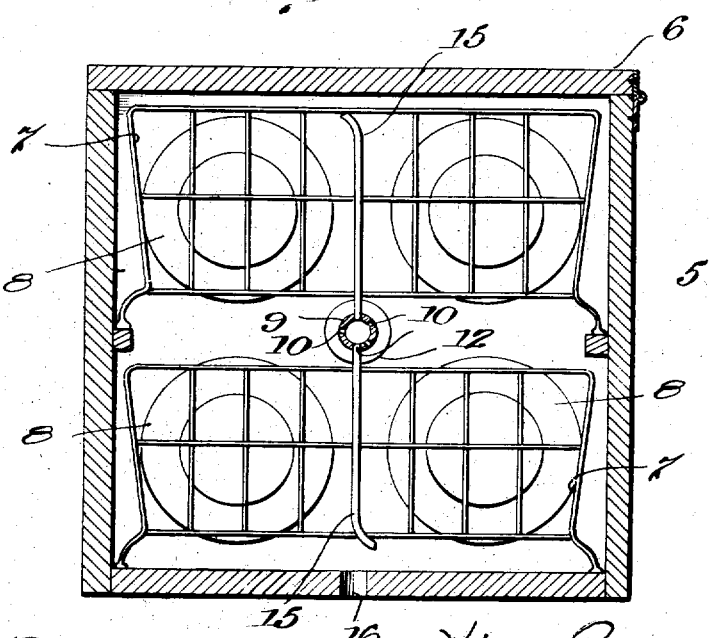

In the drawing,

Figure 1 is a central longitudinal section of the apparatus, and Fig. 2 is a cross-section thereof.

Referring specifically to the drawing, 5 denotes a water-tight receptacle of any suitable contour and dimension, in which the dishes to be washed are placed, access to the receptacle being had by having the same open at the top. A tight fitting hinged door 6 is provided for the top of the receptacle, and in the receptacle are mounted suitable racks 7 which support the dishes shown at 8.

Passing centrally through the receptacle 5 is a rotatable spray pipe 9 which is provided with a large number of perforations 10 through with the water is discharged. One end of the pipe 9 is closed and this end is supported in a bearing 11 mounted on the corresponding end wall of the receptacle 5. The other end of the pipe 5 is open and is supported in a bearing 12 mounted on the corresponding end wall of the receptacle. The bearing 12 has a nipple 13 which passes through the end wall of the receptacle, and on the outside of the receptacle there is coupled to the nipple a water supply hose 14 obtaining hot water from any suitable source. The bore of the nipple 13 is in communication with the open end of the pipe 9, and hence, when the water is turned on, it flows into said pipe and is sprayed through perforations 10 thereof over the dishes 8.

One end of the pipe 9 is fitted with two diametrically opposite, and radially extending discharge tubes 15 from which the water is discharged at their outer ends, said ends being bent laterally to obtain a tangential discharge. The reaction of the water discharged from the tubes 15 at the outer ends thereof causes said arms to revolve and thus rotate the pipe 9, with the result that the water discharging from the perforations 10 is continually sprayed over the dishes 8, and the latter are rapidly and thoroughly cleansed. The receptacle is provided with a drain 16.

The apparatus is very simple and efficient, and it is well adapted for domestic use as it can be operated by connecting the hose 14 to the hot water faucet in the kitchen. The apparatus is also economical in operation as the amount of water it requires is not greater than that ordinarily used when washing and rinsing dishes by hand.

I claim:

1. A dish washer comprising, in combination, a dish receptacle, a spray device mounted to rotate upon a horizontal axis within said receptacle and adapted to direct the spray in directions generally transverse to said axis, said spray device being provided with reaction jets for continuous complete rotation of the same whereby the spray is caused to sweep in continuous complete circles about the axis of rotation of said spray device, and a liquid supply connection for said spray device.

2. A dish washer comprising, in combination, a walled dish receptacle, a spray device extending horizontally between and rotatably supported by opposite walls of said receptacle, said spray device being provided with reaction jets for continuous complete rotation of the same whereby said spray is caused to sweep in continuous complete circles about said axis, and a liquid supply connection for said spray device.

3. A dish washer comprising, in combination, a dish receptacle, a spray device mounted to rotate upon a horizontal axis within said receptacle and adapted to direct the spray in directions generally transverse to said axis, said spray device being provided with reaction jets for continuous complete rotation of the same whereby said spray is caused to sweep in continuous complete circles about said axis, a liquid supply connection for said spray device and dish-supporting means arranged in said receptacle about said spray device.

4. A dish washer comprising, in combination, a walled receptacle, a centrally located spray device supported by opposite walls of said receptacle to rotate upon a horizontal axis within the same, said spray device being provided with reaction jets for continuous complete rotation of the same whereby the spray is caused to sweep in continuous complete circles about said axis, a liquid supply connection for said spray device and dish-supporting means arranged above and below said spray device.

5. A washing apparatus comprising a receptacle, a perforated spray pipe mounted to extend horizontally of the receptacle and to rotate upon its axis, said spray pipe being provided with reaction jets for continuous complete rotation of the same whereby the spray device is caused to sweep in continuous complete circles about said axis, and dish supporting means arranged to support dishes about said spray pipe.

6. A washing apparatus comprising a receptable, a perforated spray pipe extending horizontally and centrally between the opposite end walls of the receptacle and rotatably supported, a water supply connection to the pipe, radially extending discharge tubes carried by the spray pipe adjacent to one end thereof for rotating said pipe by the reaction of the water discharged from the outer ends of said tubes, and dish supporting racks mounted in the receptacle parallel to the spray pipe, and located above and below the same.

In testimony whereof I affix my signature.

HARRY ROSENBAUM.